(12) United States Patent
Maruyama et al.

(10) Patent No.: US 7,274,630 B2
(45) Date of Patent: Sep. 25, 2007

(54) LAYER DISCRIMINATING FOCUS CONTROL APPARATUS, OPTICAL DISK APPARATUS, AND METHODS THEREFORE

(75) Inventors: Sumitaka Maruyama, Yokohama (JP); Masahiko Tanaka, Kawasaki (JP); Hideaki Ohsawa, Yokohama (JP); Maho Kuwahara, Tokyo (JP); Akihito Ogawa, Yokohama (JP); Kazuto Kuroda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 505 days.

(21) Appl. No.: 10/391,603

(22) Filed: Mar. 20, 2003

(65) Prior Publication Data

US 2003/0179662 A1 Sep. 25, 2003

(30) Foreign Application Priority Data

Mar. 20, 2002 (JP) ............................. 2002-079298

(51) Int. Cl.
*G11B 7/095* (2006.01)
(52) U.S. Cl. .................................. 369/44.27
(58) Field of Classification Search ............. 369/44.27; G11B 7/095
See application file for complete search history.

(56) References Cited

U.S. PATENT DOCUMENTS 5,086,420 A * 2/1992 Doi ........................ 369/44.25
5,963,524 A * 10/1999 Tokiwa et al. ............ 369/53.23
6,052,344 A * 4/2000 Ueki ........................ 369/44.27
6,249,494 B1 * 6/2001 Ueki ........................ 369/44.27
6,731,578 B1 * 5/2004 Sako et al. ............... 369/53.23

FOREIGN PATENT DOCUMENTS

| JP | 4-123321 | 4/1992 |
|---|---|---|
| JP | 05-54406 | * 3/1993 |
| JP | 06-325481 | * 11/1994 |

OTHER PUBLICATIONS

MAT (machine assisted translation) of JP 5-54406.*
MAT (machine assisted translation) of JP 6-325481.*

* cited by examiner

*Primary Examiner*—A M Psitos
(74) *Attorney, Agent, or Firm*—Pillsbury Winthrop Shaw Pittman, LLP

(57) ABSTRACT

This invention relates to a focus control apparatus having a controller which generates a control signal and performs focus operation when the peak timing of a focus sum signal based on reflected light and the zero-crossing timing of a focus error signal are detected to substantially coincide with each other in supplying a control signal to a lens actuator driver for supplying a driving signal to a lens actuator for driving a lens. The invention also relates to an optical disk apparatus using the focus control apparatus. By detecting coincidence of the two timings, two reflected waves are discriminated, and stable focus operation is achieved.

8 Claims, 4 Drawing Sheets

LAYER DISCRIMINATING FOCUS CONTROL APPARATUS, OPTICAL DISK APPARATUS, AND METHODS THEREFORE

CROSS-REFERENCE TO RELATED APPLICATIONS

This application is based upon and claims the benefit of priority from the prior Japanese Patent Application No. 2002-079298, filed Mar. 20, 2002, the entire contents of which are incorporated herein by reference.

BACKGROUND OF THE INVENTION

1. Field of the Invention

The present invention relates to a light beam focus control apparatus and optical disk apparatus and, more particularly, to a focus control apparatus and optical disk apparatus which discriminate waves reflected by a recording/reproducing layer surface on an optical disk and a light-transmitting layer surface (optical disk surface) and adjust the focus of a light beam.

2. Description of the Related Art

Optical disk recording/reproducing apparatuses using optical disks are recently becoming very popular. As the recording information density increases, the light beam focus control technique requires a higher precision.

One of optical disk focus control references is Jpn. Pat. Appln. KOKAI Publication No. 4-123321. This prior art prevents erroneous focus servo control on a light-transmitting layer surface (optical disk surface) in servo control. For this purpose, AGC (Auto Gain Control) operation is restricted to keep the gain at a predetermined position or less during focus servo control operation. The light-transmitting layer surface (optical disk surface) and recording/reproducing layer surface can then be reliably recognized. This realizes high-precision focus control and enables recording/reproducing processing with respect to a high-density optical disk.

When the focus sum signal is at almost the same level between the light-transmitting layer surface (optical disk surface) and the recording/reproducing layer surface, waves reflected by the light-transmitting layer surface (optical disk surface) and waves reflected by the recording/reproducing layer surface cannot be discriminated by a method using the conventional apparatus. The focus is erroneously adjusted to the light-transmitting layer surface (optical disk surface).

BRIEF SUMMARY OF THE INVENTION

It is an embodiment of the present invention to discriminate a recording/reproducing layer surface and a light-transmitting layer surface (optical disk surface) on the basis of the peak timing of a focus sum signal and the zero-crossing timing of a focus error signal, and stably perform focus operation for only the recording/reproducing layer surface.

According to one embodiment of the present invention, there is provided a laser beam focus control apparatus comprising an objective lens which converges an emitted laser beam and sends the laser beam to an information storage medium, a photodetector which receives reflected waves of the laser beam sent by the objective lens and outputs a corresponding detection signal, a generator which receives the detection signal from the photodetector and generates a focus sum signal and a focus error signal, a driver which supplies a driving signal for driving the objective lens in accordance with a supplied control signal, an actuator which receives the driving signal from the driver and properly moves the objective lens in accordance with the driving signal, and a controller which receives the focus sum signal and the focus error signal from the generator and which, upon detecting that a peak timing of the focus sum signal and a zero-crossing timing of the focus error signal substantially coincide with each other, generates the control signal, and supplies the control signal to the driver so as to properly move the objective lens and focus the laser beam on the information storage medium.

Even if focus sum signals of waves reflected by the recording/reproducing layer surface and light-transmitting layer surface of an optical disk have no difference in peak level, a focus control apparatus according to one embodiment of the present invention determines whether the signal is formed from waves reflected by the recording/reproducing layer surface, depending on whether the peak timing of the focus sum signal and the zero-crossing timing of the focus error signal substantially coincide with each other. The recording/reproducing layer surface of the optical disk can be always stably detected based on the determination method. The focus control apparatus can realize reliable focus operation.

DETAILED DESCRIPTION OF THE INVENTION

A preferred embodiment of a focus control apparatus according to one embodiment of the present invention and an optical disk apparatus to which the focus control apparatus is applied will be described in detail below with reference to several views of the accompanying drawing.

Figure 1:
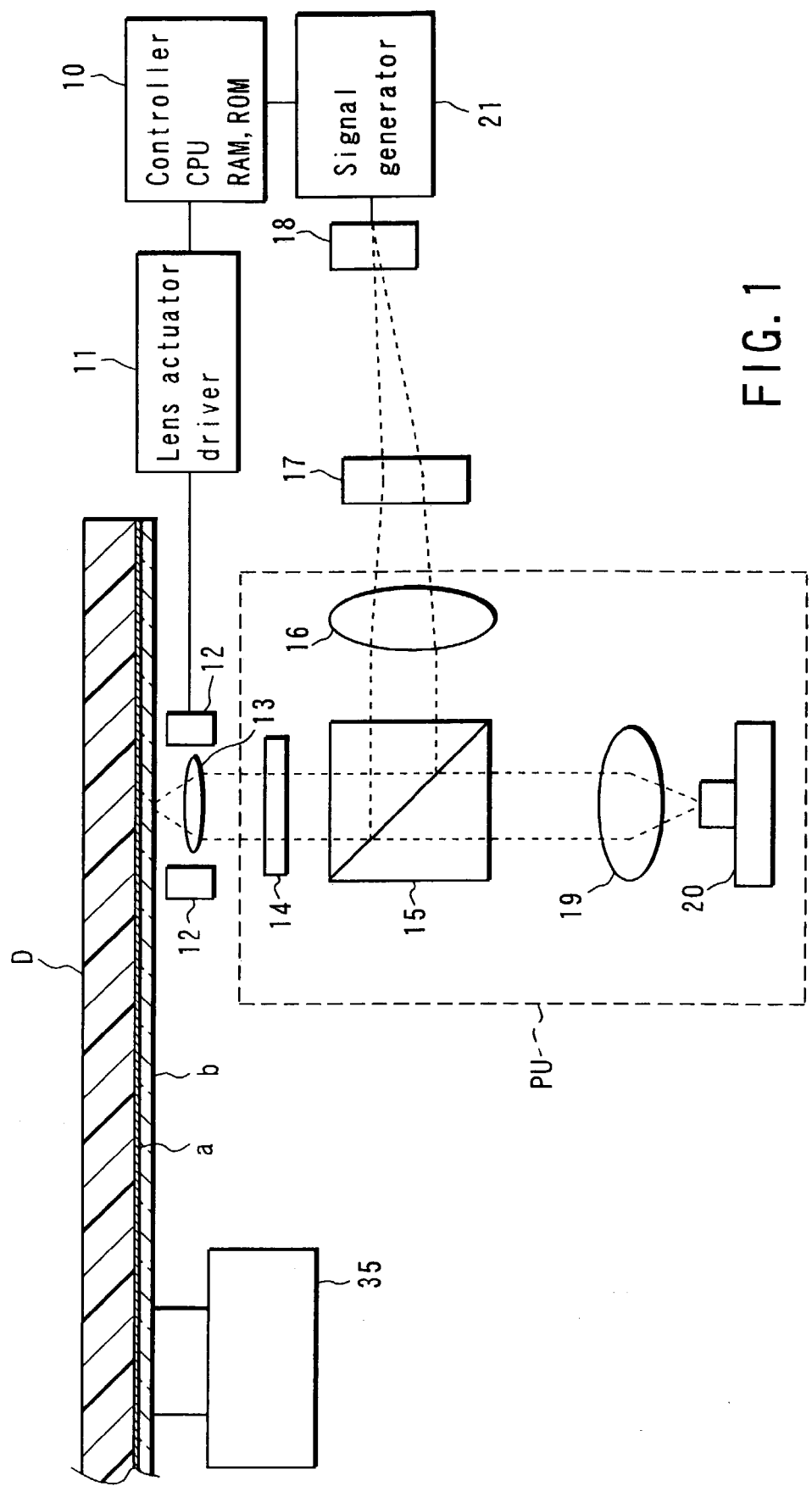
FIG. 1 is a view showing an example of a focus control apparatus according to one embodiment of the present invention.
Figure 2:
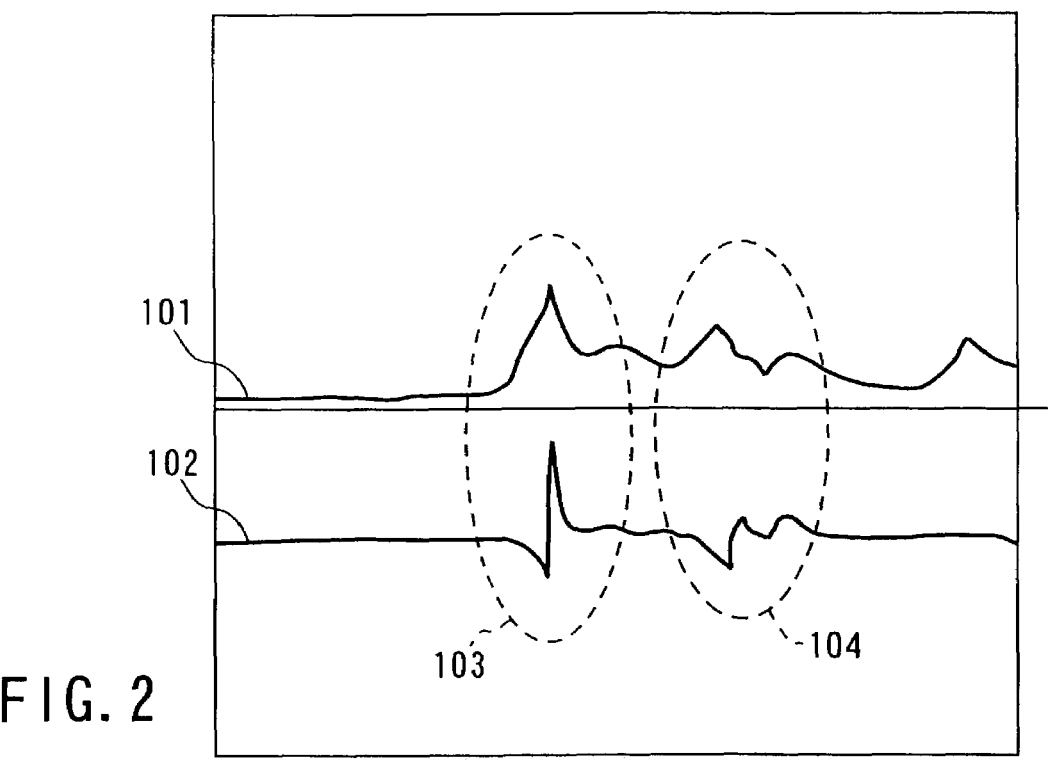
FIG. 2 is a graph showing an example of a focus sum signal and focus error signal on the recording/reproducing layer of an optical disk and the optical disk surface.
Figure 3:
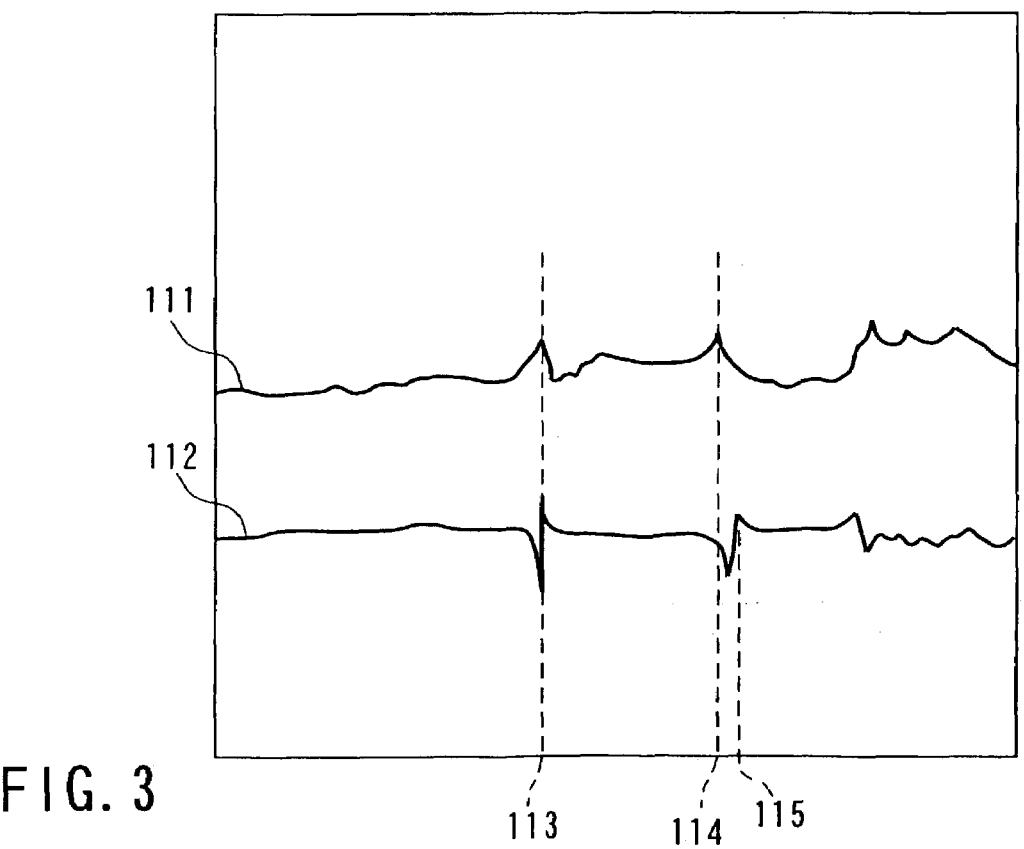
FIG. 3 is a graph showing another example of the focus sum signal and focus error signal on the recording/reproducing layer of an optical disk and the optical disk surface.
Figure 4:
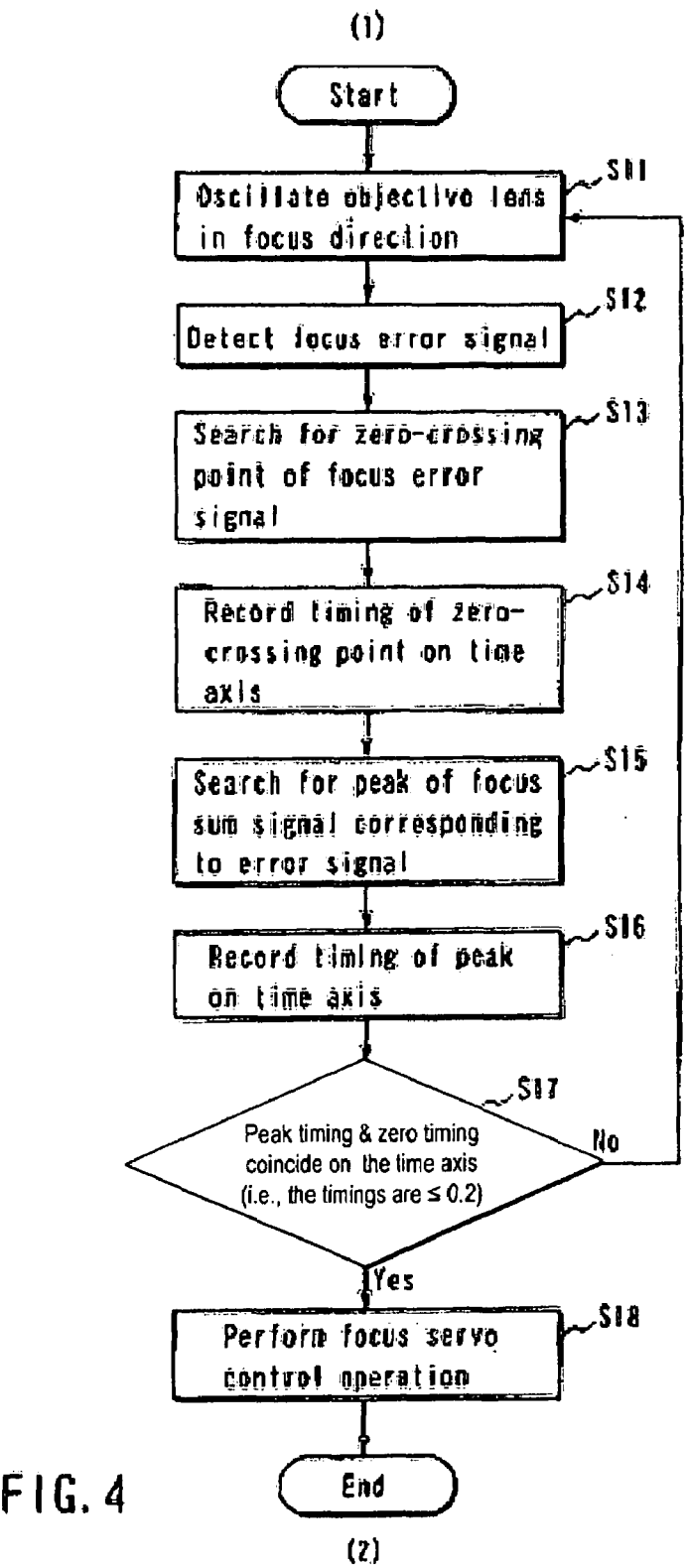
FIG. 4 is a flow chart for explaining the focus control method of the focus control apparatus according to one embodiment of the present invention.
Figure 5:
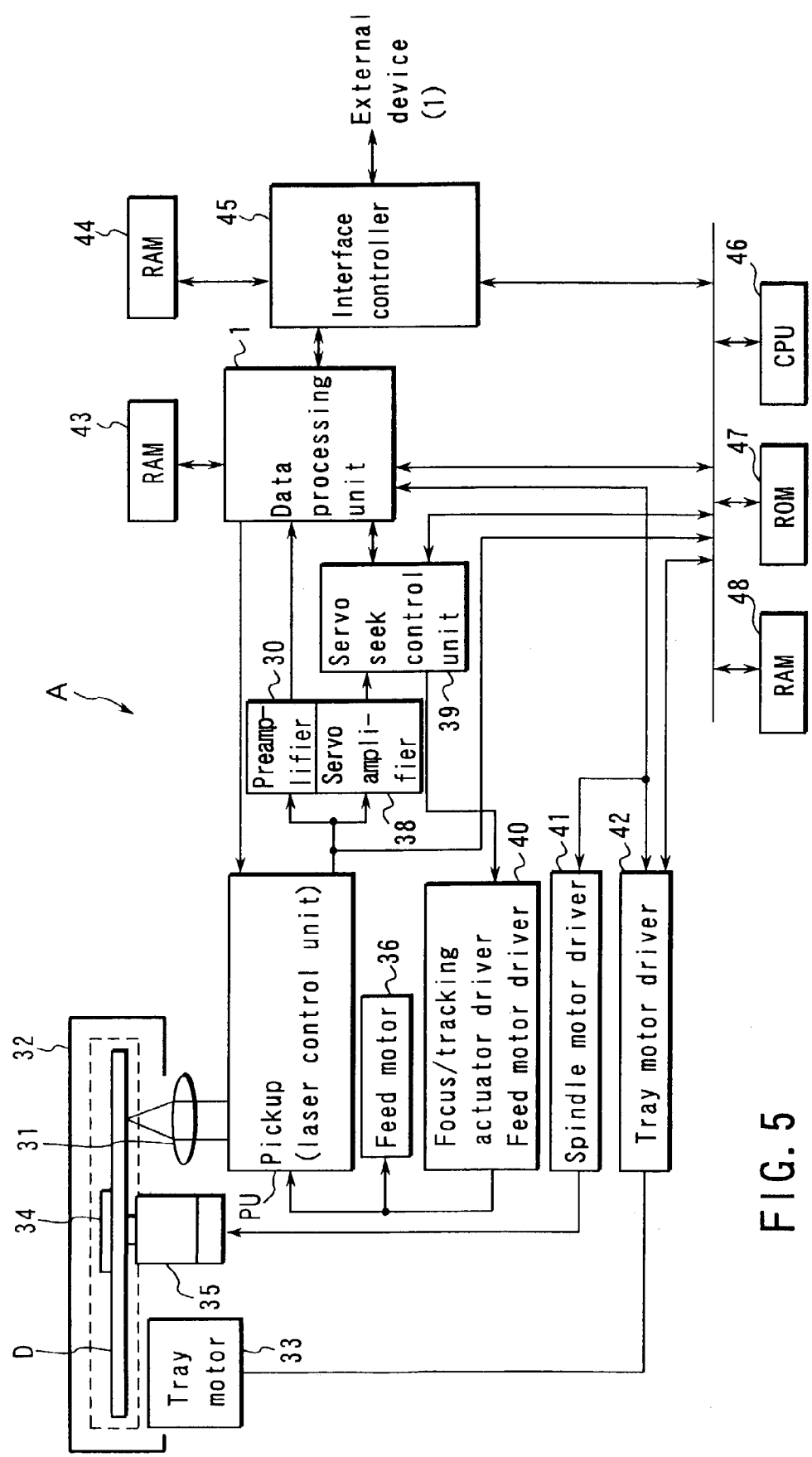
FIG. 5 is a block diagram showing a structure of an optical disk apparatus to which the focus control apparatus according to one embodiment of the present invention is applied.

FIG. 1 is a view showing an example of the focus control apparatus according to one embodiment of the present invention. FIG. 2 is a graph showing an example of a focus sum signal and focus error signal on the surfaces of the recording/reproducing layer and light-transmitting layer of an optical disk. FIG. 3 is a graph showing another example of the focus sum signal and focus error signal on the surfaces of the recording/reproducing layer and light-transmitting layer of the optical disk. FIG. 4 is a flow chart for explaining the focus control method of the focus control apparatus. FIG. 5 is a block diagram showing a structure of the optical disk apparatus to which the focus control apparatus according to one embodiment of the present invention is applied.

<Focus Control Apparatus>

A focus control apparatus according to one embodiment of the present invention that is mainly used for an optical disk apparatus will be explained in detail below with reference to several views of the accompanying drawing.

This embodiment will exemplify a phase change optical disk, but the focus control apparatus can be widely applied to optical heads for an information storage medium having a light-transmitting layer. The information storage medium subjected to recording and reproduction may be a read-only optical disk, magneto-optical disk, or optical card.

As shown in FIG. 1, the focus control apparatus according to one embodiment of the present invention comprises an information storage medium such as an optical disk D, and a spindle motor 35 which rotates the information storage medium. The information storage medium is rotated at a predetermined rotation speed. The optical disk D subjected to recording/reproduction by an optical pickup head PU has a light-transmitting layer b in order to protect a recording/reproducing layer surface a.

Light emitted by an LD (Laser Diode) light source 20 passes through a collimator lens 19 and λ/4 wave plate 14, enters an objective lens 13, and forms an image on the recording/reproducing layer surface a of the optical disk D.

Light reflected by the recording/reproducing layer surface a of the optical disk D passes through the λ/4 wave plate 14, and is reflected by a polarized beam splitter 15. Reflected light passes through a detection lens 16 and diffraction element 17, and reaches a photodetector 18. The photodetector 18 is generally divided into a plurality of parts, and outputs a detection signal corresponding to the light intensity. The detection signal from the objective lens 13 is supplied to a focus signal generator 21. The focus signal generator 21 generates a focus sum signal and focus error signal, which are supplied to a controller 10 including a CPU 46, ROM 47, and RAM 48 shown in FIG. 5. The detection signal is also used to generate an RF signal and tracking signal in the optical disk apparatus.

The focus control apparatus also comprises a lens actuator driver 11 (included in each driver 40 in FIG. 5) which is controlled by a control signal supplied from the controller 10. The lens actuator driver 11 has lens actuators 12 which move the objective lens 13 in the focus direction.

(Focus Control of Focus Control Apparatus According to the Present Invention)

The present embodiment adopts a double knife-edge method as a focus error detection method for descriptive convenience. However, another detection method such as an astigmatism method (to be described later) can yield the same operation effects of the present invention.

A conventional apparatus performs the focus servo control by the following procedures. A focus sum signal is observed in focus signals obtained by the photodetector 18. When this signal exceeds a given signal level, the focus servo is turned on and adjusts the focus so as to make the focus error signal zero. If a focus sum signal 101 exhibits a signal level difference between a signal 103 on the recording/reproducing layer surface and a signal 104 on the light-transmitting layer surface (optical disk surface), as shown in FIG. 2, the signals 103 and 104 can be discriminated by the signal level difference.

If, however, a focus sum signal 111 is at the same level between a signal 113 on the recording/reproducing layer surface a and a signal 114 on the light-transmitting layer b (optical disk surface), as shown in FIG. 3, the signals 113 and 114 cannot be discriminated.

For example, for an optical disk whose data is reproduced by an optical system having a light-transmitting layer thickness of 0.1 mm and NA=0.85, the reflectance of the light-transmitting layer surface b (optical disk surface) is about 4% to 5%, and that of the recording/reproducing layer surface a is also about 4% to 5% in order to ensure a high signal intensity. These reflectances are almost the same, and the focus servo control is actuated at an erroneous timing by the focus servo method of the conventional apparatus.

The focus sum signal 111 and a focus error signal 112 in the signal 113 on the recording/reproducing layer surface and in the signal 114 on the light-transmitting layer surface (optical disk surface) in FIG. 3 will be compared. In the signal 113 on the recording/reproducing layer surface, the zero-crossing point of the focus error signal 112 and the peak of the focus sum signal 111 are obtained at the same timing. In the signal 114 on the light-transmitting layer surface (optical disk surface), the zero-crossing timing of the focus error signal 112 and the peak timing of the focus sum signal 111 shift from each other.

This is because the objective lens 13 is designed in consideration of the protection layer thickness (e.g., 0.1 mm or 0.6 mm). When the recording/reproducing layer surface a is in focus, no spherical aberration occurs. If the light-transmitting layer surface b is in focus, light does not pass through the protection layer, generating spherical aberration. Spherical aberration does not greatly influence the focus sum signal, but reduces the focus error signal. Then, the zero-crossing timing of the focus error signal and the peak timing of the focus sum signal shift from each other.

To prevent this, the embodiment performs focus operation only while the zero-crossing timing of the focus error signal and the peak timing of the focus sum signal coincide with each other. If these timings shift from each other, the focus servo is kept inactivated. This prevents erroneous focus operation on the light-transmitting layer surface b (optical disk surface).

(Detailed Description of Operation by Flow Chart)

An example of focus servo control operation will be explained in detail with reference to the flow chart of FIG. 4. The objective lens 13 is oscillated in the focus direction (S11). The focus error signal 112 is detected (S12). The zero-crossing point of the focus error signal is searched for (S13), and the timing of the zero-crossing point on the time axis is recorded (S14). The peak timing of a focus sum signal corresponding to the focus error signal on the time axis is searched for and recorded (S15 and S16).

Whether the two timings coincide with each other is checked (S17). Only if Yes in step S17, focus servo control operation is executed; if No, the flow returns to step S11 to detect another focus error signal. By repeating the same operation, focus servo control operation can be done only on the recording/reproducing layer surface a.

(Coincidence Range)

In this embodiment, focus servo control operation is performed only when the zero-crossing timing of the focus error signal and the peak timing of the focus sum signal coincide with each other. The two timings can be considered to coincide with each other as long as they fall within a given range.

Even with a given error in the coincidence degree, the recording/reproducing layer surface a and light-transmitting layer surface b (optical disk surface) can be discriminated from each other. For example, for an optical disk protection layer thickness of 0.1 mm, the shift on the time axis between the zero-crossing timing of the focus error signal and the peak timing of the focus sum signal on the recording/reproducing layer is 20% or less of that in the coincidence state. In this case, calculation shows that focus servo control operation is done only on the recording/reproducing layer surface a without erroneously performing focus servo control on the light-transmitting layer surface b (optical disk surface).

Assume that the time from a timing at which the focus error signal exhibits a maximum value to a timing at which it exhibits a minimum value is 1. Then, when the time from the peak timing of the focus sum signal to the zero-crossing timing of the focus sum signal is 0.2 or less, these timings are considered to coincide with each other. The signal is determined as a focus error signal of waves reflected by the recording/reproducing layer surface a, and focus servo control operation is executed.

In the focus control apparatus according to one embodiment of the present invention, if the peak timing of the focus sum signal and the zero-crossing timing of the focus error signal coincide with each other within a predetermined time, the signal is determined as a focus error signal of waves reflected by the recording/reproducing layer surface a. Focus servo control operation is then executed to discriminate a focus error signal from the recording/reproducing layer surface a and a focus error signal from the light-transmitting layer surface b serving as an optical disk surface, which may not be discriminated by the conventional apparatus. The present invention, therefore, provides a focus control apparatus which can prevent erroneous focus adjustment to the optical disk surface.

<Optical Disk Apparatus>

An optical disk apparatus will be described as an example of an information recording/reproducing apparatus using the above-described focus control apparatus.

(Basic Arrangement of Optical Disk Apparatus)

In FIG. 5, an optical disk apparatus A using the focus control apparatus according to one embodiment of the present invention records/reproduces data on/from the optical disk D. The optical disk apparatus A comprises a tray 32 which conveys the optical disk D stored in a disk cartridge, a motor 33 which drives the tray, a damper 34 which holds the optical disk D, and a spindle motor 35 which rotates the held optical disk D at a predetermined rotation speed. The optical disk apparatus A is connected via a control bus to the CPU 46 which performs overall operation control as a controller, the ROM 47 which stores the basic program of control operation and the like, and the RAM 48 which stores control programs, application data, and the like in a rewritable manner. The optical disk apparatus A also comprises a feed motor 36 which is connected to the respective controllers such as the CPU 46 and conveys the pickup PU, a focus/tracking actuator driver & feed motor driver 40 which executes focus/tracking control of the pickup, a spindle motor driver 41 which drives the spindle motor 35, and a tray motor driver 42 which drives the tray motor.

The optical disk apparatus A comprises a preamplifier 30 and servo amplifier 38 which are connected to the pickup PU and amplify a detection signal, and a servo seek control unit 39 which supplies a seek signal for seek operation to the driver. The optical disk apparatus A further comprises a data processing unit 1 which is connected to the pickup PU, preamplifier 30, servo seek control unit 39, and the like and processes a detection signal and recording signal, and a RAM 43 which stores data used for various processes. An interface controller 45 is arranged together with a RAM 44 in order to exchange a signal from the data processing unit 1 with an external device.

(Basic Operation of Optical Disk Apparatus)

The optical disk apparatus having the above arrangement to which the focus control apparatus of the present invention is applied executes the following optical disk reproducing processing and recording processing. When the optical disk D is loaded into the optical disk apparatus A, control information of the optical disk D recorded in a control data zone within the embossed data zone of the read-in area of the optical disk D is read using the pickup head PU and data processing unit 1. The control information is supplied to the CPU 46.

In the optical disk apparatus A to which the focus control apparatus of the present invention is applied, the LD light source 20 generates a light beam under the control of the CPU 46 on the basis of operation information of user operation, control information of the optical disk D recorded in the control data zone on the optical disk, the current status, and the like.

The generated laser beam is converged by the objective lens 13 and incident on the recording area of the optical disk D, thereby recording data in the recording area of the optical disk D (generation of a mark string: data is recorded on the optical disk D by the interval between variable-length marks and the length of each variable-length mark). Alternatively, light having an intensity corresponding to stored data is reflected and detected to reproduce the data.

In FIG. 5, the settings of a laser control unit included in the pickup head PU are done by the data processing unit 1. The settings change depending on reproducing power for obtaining a reproducing signal RF, recording power for recording data, and erase power for erasing power. The laser beam has powers of different levels for the three, reproducing, recording, and erase powers. A semiconductor laser unit is biased by the laser control unit so as to generate a laser beam of each power.

The laser control unit is formed from a resistor and transistor (not shown), and the power supply voltage is applied to the resistor, the transistor, and a semiconductor laser serving as the semiconductor laser unit. The amplification factor changes depending on the base current of the transistor, and different currents flow through a semiconductor laser oscillator to generate laser beams with different intensities.

The optical disk D is loaded into the apparatus by the tray 32 directly or upon being stored in the disk cartridge, so as to make the optical disk D face the objective lens 13. The tray motor 33 for driving the tray 32 is arranged in the apparatus. The loaded optical disk D is rotatably held on the spindle motor 35 by the damper 34, and rotated by the spindle motor 35 at a predetermined rotation speed.

The pickup head PU incorporates the photodetector 18 which detects a laser beam. The photodetector 18 detects a laser beam which is reflected by the optical disk D and returns via the objective lens 13. If the peak timing of the focus sum signal and the zero-crossing timing of the focus error signal coincide with each other within a predetermined time on the basis of a detection signal from the photodetector 18, as described above, the signal is determined as a focus error signal of waves reflected by the recording/reproducing layer surface a. Focus servo control operation is then executed to discriminate a focus error signal from the recording/reproducing layer surface a and a focus error signal from the light-transmitting layer surface b serving as an optical disk surface, which may not be discriminated by the conventional apparatus. Accordingly, the present invention provides a focus control apparatus which can prevent erroneous focus adjustment to the optical disk surface.

The detection signal is supplied to the preamplifier 30 and servo amplifier 38. The preamplifier 30 outputs, to the data processing unit 1, a signal for reproducing data at the header and a signal for reproducing data in the recording area. A track error signal from the servo amplifier 38 is output to the servo seek control unit 39.

A method of optically detecting the defocus amount includes the following astigmatism method and the above-mentioned knife-edge method.

In the astigmatism method, an optical element (not shown) which generates astigmatism is inserted in the detection optical path of a laser beam reflected by the light-transmitting layer surface b or light-reflecting recording/reproducing layer surface a of the optical disk D. A change in the shape of the laser beam incident on the photodetector is detected. The light detection area is diagonally divided into four. The difference between the diagonal sums of detection signals from the respective detection areas is calculated within the servo seek control unit 39 to obtain a focus error signal (focus signal).

The knife-edge method adopts a knife edge which asymmetrically cuts off part of a laser beam reflected by the optical disk D. The light detection area is divided into two, and the difference between detection signals from the respective detection areas is calculated to obtain a focus error signal.

In general, either the astigmatism method or knife-edge method is employed.

The optical disk D has spiral or concentric tracks, and information is recorded on the track. The track is traced with a focused light spot to reproduce or record/erase information. To stably trace the track with the light spot, a relative positional shift between the track and the light spot must be optically detected.

General track shift detection methods are the following differential phase detection method, push-pull method, and twin-spot method.

In the differential phase detection method, a change in the intensity distribution of a laser beam on the photodetector that is reflected by the light-transmitting layer surface b or recording/reproducing layer surface a of the optical disk D is detected. The light detection area is diagonally divided into four. The phase difference between the diagonal sums of detection signals from the respective detection areas is calculated within the servo seek control unit 39 to obtain a track error detection signal (tracking signal).

In the push-pull method, a change in the intensity distribution of a laser beam on the photodetector that is reflected by the optical disk D is detected. The light detection area is divided into two. The difference between detection signals from the respective detection areas is calculated to obtain a track error detection signal.

In the twin-spot method, light is wave-front-split into a plurality of components by arranging a diffraction element in a light output system between the semiconductor laser element and the optical disk D. Changes in the reflected light quantities of ±1st-diffracted light components incident on the optical disk D are detected. Light detection areas for individually detecting the reflected light quantities of +1st- and −1st-diffracted light components are arranged in addition to a light detection area for detecting a reproducing signal. The difference between detection signals is calculated to obtain a track error detection signal.

By this track control, the servo seek control unit 39 supplies a tracking signal and feed signal to the lens actuator driver 11 and the tracking actuator driver & feed motor driver 40. The driver 40 executes tracking service control. The driver 40 supplies a bias signal to the feed motor 36 in accordance with the access signal, and the pickup head PU is conveyed and controlled.

The servo seek control unit 39 is controlled by the data processing unit 1. For example, the data processing unit 1 supplies an access signal to the servo seek control unit 39 to generate a feed signal.

The spindle motor driver 41 and tray motor driver 42 are controlled by a control signal from the data processing unit 1. The spindle motor 35 and tray motor 33 are biased, the spindle motor 35 is rotated at a predetermined rotation speed, and the tray motor 33 properly controls the tray.

The reproducing signal RF corresponding to header data supplied to the data processing unit 1 is supplied to the CPU 46. The CPU 46 determines a sector number as a header address from the reproducing signal RF, and compares the sector number with a sector number serving as an access address (at which data is recorded or from which recorded data is reproduced).

Necessary data is stored in the RAM 48. The reproducing signal RF which corresponds to data in the recording area and is supplied to the data processing unit 1 is processed by the data processing unit 1, and supplied to the interface controller 45. The reproducing processing signal is supplied to an external device such as a personal computer.

By applying the focus control apparatus according to one embodiment of the present invention, the optical disk apparatus can discriminate a focus error signal of waves reflected by the recording/reproducing layer surface a of the optical disk D and a focus error signal of waves reflected by the light-transmitting layer surface b serving as the surface of the optical disk D. The optical disk apparatus can stably perform reliable focus control on any optical disk D, and realizes reliable recording processing and reproducing processing.

This embodiment has exemplified the optical disk apparatus in detail. However, the focus control apparatus according to one embodiment of the present invention can be widely applied to optical heads for an information storage medium having a light-transmitting layer, in addition to the optical disk apparatus. The information storage medium subjected to recording and reproduction may be a read-only optical disk, magneto-optical disk, or optical card. The same operation effects can be attained by the same operation principle of the present invention.

The present invention can be realized by those skilled in the art on the basis of various embodiments described above. Various modifications of the embodiments will readily occur to those skilled in the art, and the present invention can be applied to various embodiments without any inventiveness. The present invention covers a wide range which does not contradict with the disclosed principle and new features, and is not limited to the above-described embodiments.

As has been described in detail above, the embodiment provides a focus control apparatus, optical disk apparatus, and their methods capable of discriminating the light-transmitting layer surface and recording/reproducing layer surface of an optical disk, and stably performing focus operation.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A laser beam focus control apparatus comprising:
an objective lens which converges an emitted laser beam and sends the laser beam to an information storage medium;
a photodetector which receives reflected waves of the laser beam sent by the objective lens and outputs a corresponding detection signal;
a generator which receives the detection signal from the photodetector and generates a focus sum signal and a focus error signal;
a driver which supplies a driving signal for driving the objective lens in accordance with a supplied control signal;
an actuator which receives the driving signal from the driver and properly moves the objective lens in accordance with the driving signal; and
a controller configured to:
 (a) detect the focus error signal;
 (b) search and record timing of zero-crossing point of the focus error signal;
 (c) search and record peak timing of the focus sum signal that corresponds to the focus error signal on the time axis;
 (d) discriminate the focus error signal from the recording/reproducing layer surface and the focus error signal from the light-transmitting layer surface;
 (e) maintain the focus servo inactive when the zero-cross timing of the focus error signal and the peak timing of the focus sum signal are shifted from each other to prevent an erroneous focus operation on the light-transmitting layer surface; and
 (e) perform focus servo control operation only on the recording/reproducing layer surface wherein, assuming that a time from a timing at which the focus error signal exhibits a maximum value to a timing at which the focus error signal exhibits a minimum value is 1, when a time from the peak timing of the focus sum signal to the zero crossing timing of the focus error signal is not longer than 0.2, the controller generates the control signal, and supplies the control signal to the driver so as to properly move the objective lens and focus the laser beam on the information storage medium.

2. An apparatus according to claim 1, wherein the information storage medium has a recording/reproducing layer and a light transmitting layer which is formed on a surface of the recording/reproducing layer in order to protect the recording/reproducing layer and transmits the laser beam, and the controller receives the focus sum signal and the focus error signal from the generator and, upon detecting that the peak timing of the focus sum signal and the zero crossing timing of the focus error signal substantially coincide with each other, generates the control signal, and supplies the control signal to the driver so as to properly move the objective lens and focus the laser beam on the recording/reproducing layer surface via the light transmitting layer of the information storage medium.

3. A laser beam focus control method comprising:
converging an emitted laser beam and sending the laser beam to an optical disk by using an objective lens;
receiving reflected waves of the sent laser beam and outputting a corresponding detection signal by using a photodetector;
receiving the detection signal and generating a focus sum signal and a focus error signal;
generating a driving signal for driving the objective lens in accordance with a supplied control signal and properly moving the objective lens;
detecting the focus error signal;
searching for zero-crossing point of the focus error signal;
recording timing of the zero-crossing point of the focus error signal;
searching for peak timing of the focus sum signal corresponding to the focus error signal on the time axis,
recording the peak timing of the focus sum signal;
discriminating the focus error signal from the recording/reproducing layer surface and the focus error signal from the light-transmitting layer surface;
maintaining the focus servo inactive when the zero-cross timing of the focus error signal and the peak timing of the focus sum signal are shifted from each other to prevent an erroneous focus operation on the light-transmitting layer surface; and
performing focus servo control operation only on the recording/reproducing layer surface wherein, assuming that a time from a timing at which the focus error signal exhibits a maximum value to a timing at which the focus error signal exhibits a minimum value is 1, when a time from the peak timing of the focus sum signal to the zero crossing timing of the focus error signal is not longer than 0.2, the control signal so generated as to properly move the objective lens and focus the laser beam on the optical disk is supplied to the step of moving the objective lens.

4. A method according to claim 3, wherein the optical disk has a recording/reproducing layer and a light transmitting layer which is formed on a surface of the recording/reproducing layer in order to protect the recording/reproducing layer and transmits the laser beam, and the method further comprises receiving the focus sum signal and the focus error signal and, upon detecting that the peak timing of the focus sum signal and the zero crossing timing of the focus error signal substantially coincide with each other, supplying, to the step of moving the objective lens, the control signal so generated as to properly move the objective lens and focus the laser beam on the recording/reproducing layer surface via the light transmitting layer of the optical disk.

5. An optical disk apparatus comprising:
an objective lens which converges an emitted laser beam and sends the laser beam to an optical disk;
a photodetector which receives reflected waves of the laser beam sent by the objective lens and outputs a corresponding detection signal;
a generator which receives the detection signal from the photodetector and generates a focus sum signal and a focus error signal;
a driver which supplies a driving signal for driving the objective lens in accordance with a supplied control signal;
an actuator which receives the driving signal from the driver and properly moves the objective lens in accordance with the driving signal;
a controller configured to:
 (a) oscillate the objective lens;
 (b) detect the focus error signal;
 (c) search for zero-crossing point of the focus error signal;

(d) record timing of the zero-crossing point of the focus error signal;
(e) search peak timing of the focus sum signal corresponding to the focus error signal on the time axis;
(f) record the peak timing of the focus sum signal;
(g) perform focus servo control operation only on the recording/reproducing layer surface when the zero-crossing point timing of the focus error signal and the peak timing of the focus sum signal coincide with each other;
(h) a processor which, after focus is adjusted under control of the controller, performs at least one of recording processing of predetermined information on a recording/reproducing layer of the optical disk by using the laser beam, and reproducing processing of reading out and reproducing predetermined information recorded on the recording/reproducing layer;
(i) discriminate the focus error signal from the recording/reproducing layer surface and the focus error signal from the light-transmitting layer surface; and
(j) maintain the focus servo inactive when the zero-cross timing of the focus error signal and the peak timing of the focus sum signal are shifted from each other to prevent an erroneous focus operation on the light-transmitting layer surface,
wherein, assuming that a time from a timing at which the focus error signal exhibits a maximum value to a timing at which the focus error signal exhibits a minimum value is 1, when a time from the peak timing of the focus sum signal to the zero crossing timing of the focus error signal is not longer than 0.2, the controller generates the control signal, and supplies the control signal to the driver so as to properly move the objective lens and focus the laser beam on the optical disk.

6. An apparatus according to claim 5, wherein the optical disk has the recording/reproducing layer and a light transmitting layer which is formed on a surface of the recording/reproducing layer in order to protect the recording/reproducing layer and transmits the laser beam, and the controller receives the focus sum signal and the focus error signal from the generator and, upon detecting that the peak timing of the focus sum signal and the zero crossing timing of the focus error signal substantially coincide with each other, generates the control signal, and supplies the control signal to the driver so as to properly move the objective lens and focus the laser beam on the recording/reproducing layer surface via the light transmitting layer of the optical disk.

7. An optical disk processing method comprising:
converging an emitted laser beam and sending the laser beam to an optical disk by using an objective lens;
receiving reflected waves of the sent laser beam and outputting a corresponding detection signal by using a photodetector;
receiving the detection signal and generating a focus sum signal and a focus error signal;
generating a driving signal for driving the objective lens in accordance with a supplied control signal and properly moving the objective lens;
oscillating the objective lens;
detecting the focus error signal;
searching for zero-crossing point of the focus error signal;
recording timing of the zero-crossing point of the focus error signal;
searching peak timing of the focus sum signal corresponding to the focus error signal on the time axis,
recording the peak timing of the focus sum signal; and
performing focus servo control operation only on the recording/reproducing layer surface when the zero-crossing point timing of the focus error signal and the peak timing of the focus sum signal coincide with each other;
after adjusting focus by the processing, performing at least one of recording processing of predetermined information on a recording/reproducing layer of the optical disk by using the laser beam, and reproducing processing of reading out and reproducing predetermined information recorded on the recording/reproducing layer;
discriminating the focus error signal from the recording/reproducing layer surface and the focus error signal from the light-transmitting layer surface; and
maintaining the focus servo inactive when the zero-cross timing of the focus error signal and the peak timing of the focus sum signal are shifted from each other to prevent an erroneous focus operation on the light-transmitting layer surface,
wherein, assuming that a time from a timing at which the focus error signal exhibits a maximum value to a timing at which the focus error signal exhibits a minimum value is 1, when a time from the peak timing of the focus sum signal to the zero crossing timing of the focus error signal is not longer than 0.2, the control signal so generated as to properly move the objective lens and focus the laser beam on the optical disk is supplied to the step of moving the objective lens.

8. A method according to claim 7, wherein the optical disk has the recording/reproducing layer and a light transmitting layer which is formed on a surface of the recording/reproducing layer in order to protect the recording/reproducing layer and transmits the laser beam, and the method further comprises receiving the focus sum signal and the focus error signal and, upon detecting that the peak timing of the focus sum signal and the zero crossing timing of the focus error signal substantially coincide with each other, supplying, to the step of moving the objective lens, the control signal so generated as to properly move the objective lens and focus the laser beam on the recording/reproducing layer surface via the light transmitting layer of the optical disk.

* * * * *